June 11, 1963           K. LEDERER           3,093,044
BUILT-IN EXPOSURE METERING ARRANGEMENT FOR
A SINGLE LENS REFLEX CAMERA
Filed March 20, 1962
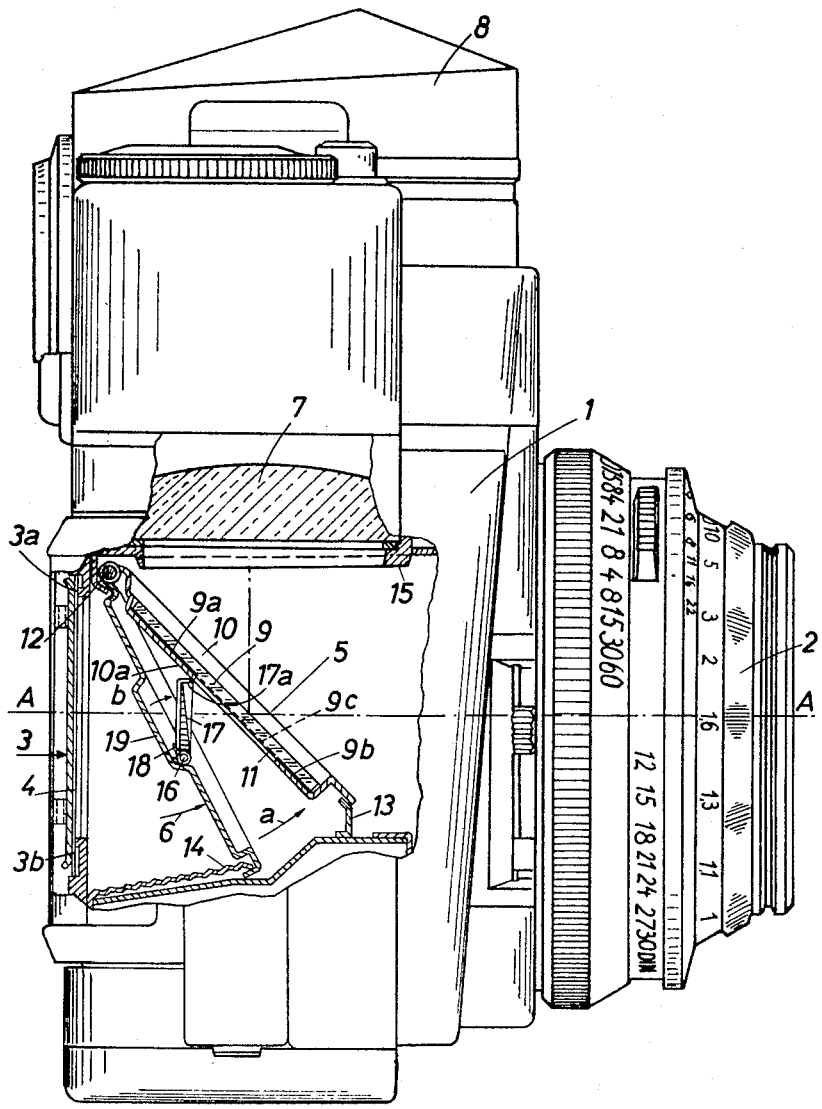
*INVENTOR.*
KURT LEDERER
BY
Connolly and Hutz
*ATTORNEYS*

United States Patent Office 3,093,044
Patented June 11, 1963

3,093,044
BUILT-IN EXPOSURE METERING ARRANGEMENT
FOR A SINGLE LENS REFLEX CAMERA
Kurt Lederer, Munich, Germany, assignor to Agfa Aktiengesellschaft, Leverkusen-Bayerwerk, Germany, a corporation of Germany
Filed Mar. 20, 1962, Ser. No. 181,046
Claims priority, application Germany Mar. 25, 1961
11 Claims. (Cl. 95—10)

This invention relates to a single lens reflex camera having a photocell associated with the mirror which deflects rays of light from the object through the viewfinder before an exposure, and it more particularly relates to an efficient mounting arrangement of this sort.

In existing types of such arrangements photocells have been secured upon the rear surfaces of such mirrors in back of a semitransparent portion. However, these arrangements have the disadvantage of permitting light to strike the photocell not only from the object through the objective lens but also through the viewfinder, including for example, a ground glass or pentaprism. This extraneous light admitted through the viewfinder introduces errors into the readings provided by the photocell.

An object of this invention is to provide an exposure metering arrangement for a single lens reflex camera in which the photocell is positioned adjacent the reflecting mirror in a manner which minimizes the influence of extraneous light passing into the camera through the viewfinder.

In accordance with this invention the phototransducing element is rotatably mounted between the reflecting mirror and a sealing plate spaced at an angle in back of it when the mirror is in the reflecting position. The photocell is mounted in line with a semitransparent portion of the mirror, and it reacts against the assembly provided by the mirror and sealing plate for disposing the photocell substantially perpendicularly to the rays of light from the object passing through the semitransparent portion of the mirror. In this reflecting position totally reflecting portions of the mirror are interposed between the phototransducing element and the light rays passing through the viewfinder to shield the element from this extraneous light and to prevent it from interfering with measurement by the photocell of the light entering the camera from the object.

In accordance with a particularly effective embodiment of this invention a spring reacts between the photocell and the assembly of mirror and sealing plate for urging the cell a position substantially perpendicularly disposed to the optical axis of the camera. This photocell may be conveniently rotatably connected to the sealing plate, and the rear wall of the mirror may provide a convenient stop for engaging the end of the photocell remote from the pivot and maintaining it supported in a position perpendicular to the optical axis.

In accordance with the further embodiment of this invention the sealing plate includes a flange for engaging the mirror and a central recess for receiving the photocell when the mirror and sealing plate assembly and the phototransducing element are folded together and moved against the base of the viewfinder clear of the optical axis of the camera while the film is being exposed.

It is also convenient to make the deflecting mirror portion in front of the photocell semitransparent and the other portions of the mirror totally reflecting.

In a preferred embodiment of this invention the photocell is a photoresistor.

This invention provides the advantage of minimizing the amount of extraneous light impinging upon the photocell through the viewfinder and affecting the accuracy of exposure measurement. The use of a photoresistor for the photocell is also advantageous because it is easily mounted in the space available between the mirror and the sealing plate.

Novel features and advantages of the present invention will become apparent to one skilled in the art from a reading of the following description in conjunction with the accompanying drawings wherein similar reference characters refer to similar parts and in which the single figure is a side view in elevation partially broken away in cross section of one embodiment of this invention.

In the drawing is shown a camera housing 1 upon which are mounted an objective lens 2 and a film aperture 3 having film guides 3a and 3b maintaining the edges of film 4 in contact with aperture 3. The optical axis of the camera which passes through objective lens 2 and film aperture 3 is designated by the longitudinal centerline A—A. A reflecting mirror 5 and a light sealing plate 6 are moveably mounted in the camera housing 1 between objective lens 2 and aperture 3 and intersecting optical axis A—A. In this position mirror 5 reflects the light rays from objective lens 2 and the object through the viewfinder which includes a ground glass 7 and also a pentaprism 8. However it is apparent that pentaprism 8 is not essential, and it could be eliminated to merely provide a passageway through which the viewer observes the reflected image. Mirror 5 includes a reflecting glass 9 which is totally reflecting in areas 9a and 9b and only partially reflecting in areas 9c thereby providing a semitransparent portion 9c. Mirror 9 is mounted in a frame 10 including an opening 11 which covers at least the partially transparent or semi-transparent area 9c of mirror glass 9.

Mirror 5 and light sealing plate 6 are mounted together in an assembly at pivot shaft 12 which is securely mounted in camera housing 1 by conventional means not shown. In the focusing position mirror 5 and sealing plate 6 are maintained in the illustrated position supported against mirror stop 13 and sealing plate stop 14, which are securely mounted within camera housing 1. In this focusing position mirror 5 reflects rays of light from the object through the viewfinder to permit the photographer to view and focus the object on ground glass 7. Instead of providing stops 13 and 14, the mechanism can also be constructed to maintain mirror 5 and light sealing plate 6 interengaged with each other in the illustrated position.

When the shutter release mechanism is actuated for accomplishing an exposure of a frame of film, reflecting mirror 5 and light sealing plate 6 are moved by the operating mechanism (not shown) in the direction of arrow $a$ until the assembly of the light sealing plate and the mirror are moved against the base 15 of the viewfinder under ground glass 7. In this position sealing plate 6 has its flange engaging the rear 10a of frame 10 of the mirror 5 to prevent light from entering the camera housing 1 through the viewfinder.

As also shown in the drawing, a phototransducing element 17 is mounted upon the assembly of mirror 5 and light sealing plate 6, in the spaced angle which exists between them in the reflecting condition, by means of a pivot 16 which connects phototransducer 17 to the side of light sealing plate 6 disposed in the direction of the objective lens 2. Photocell or phototransducer 17 is conveniently made in the form of a photoresistor, and a spring 18 such as a torsion spring reacts between sealing plate 6 and photocell 17 in a direction to urge it into the vertical position in which it is disposed substantially perpendicularly to the optical axis of the camera and light rays from the object passing through the objective lens. Spring 18 accordingly reacts against photocell 17 to move it in the direction of the arrow $b$. The upper end 17a of the photocell is arrested against the back of 10a of mirror frame 10 for maintaining it disposed in the aforementioned perpendicular position to the rays of light passing through the objective lens.

In this focusing position shown in the drawing, mirror 5 and light sealing plate 6 are spaced at an angle from each other and at different angles with respect to the optical axis of the camera. These angular positions in conjunction with the vertical height of photocell 17 automatically provide a supporting and stopping arrangement for photocell 17 in which it is maintained substantially perpendicularly disposed with respect to light passing along axis A—A so that photocell 17 is supported in this position without any auxiliary abutments or stops. In this position photocell 17 is maintained in line with the semitransparent portion 9c of mirror 5 and the opening 11 in frame 10 to permit rays of light passing through the objective lens 2 from the object to impinge upon photocell 17. In this same position any extraneous light passing into the camera housing through the viewfinder are shielded from phototransducer 17 by the totally reflecting portion 9a of the mirror, which prevents such extraneous rays of light from impinging upon photocell 17 and interferring with its accurate measurement of the quantity of light impinging upon it from the object.

This arrangement advantageously permits photocell 17 to be arranged in the central portion of the picture area which is highly advantageous for accurate light exposure measurement. The division of mirror 5 into partially and totally reflecting areas 9a, 9b, and 9c also permits the photographer to determine precisely which parts of the picture area are being utilized for exposure measurement.

A recess is provided in the area of sealing plate 6 adjacent photocell 17 and it is large enough to completely receive photocell 17 when reflecting mirror 5 and light sealing plate 6 are moved by conventional means upon shutter release in the direction of arrow a toward the base 15 of the viewfinder. Front end 17a of photocell 17 slides along the rear 10a of frame 10 until photocell 17 is completely received within recess 19 against the force of spring 18 which reacts in the direction of arrow b. In this retracted position, where the mirror and light sealing plate are moved clear of the exposure area of the camera mirror, frame 10 is nested within sealing plate 6 with the flange of sealing plate 6 securely engaging the peripheral portion of frame 10 thereby sealing the camera and preventing light from entering it through the viewfinder.

Within the spirit of this invention photocell 17 can be joined as well to the rear of mirror frame 10 instead of to the light sealing plate.

What is claimed is:

1. A built-in exposure metering arrangement for a single lens reflex camera having an optical axis extending through its objective lens and film aperture and a viewfinder with its optical axis intersecting said optical axis of said camera at the deflecting mirror which moves clear of the exposure area of the camera during an exposure, said arrangement comprising at least a portion of said mirror being semitransparent, a sealing plate movably mounted in said camera between said deflecting mirror and said film aperture, a phototransducing element, rotatable means mounting said sealing plate and said deflecting mirror together at one end thereof to form an angularly associated assembly, said viewfinder having a base which forms a limit of travel for said assembly when it is moved clear of said exposure area, a mirror stop in said camera maintaining said deflecting mirror in a position for reflecting images through said viewfinder, a sealing stop disposed in front of said film aperture for maintaining said sealing plate in its sealing position at a spaced angle from said mirror in said reflecting position, pivot means mounting said phototransducing element upon said assembly between said mirror and said sealing plate and disposed in line with said semitransparent portion of said deflecting mirror, mutually engaging means upon said phototransducing element and said mirror and sealing plate assembly for maintaining said phototransducing element disposed substantially perpendicularly to the rays of light passing through said semitransparent portion from an object and vertically shielded from light rays passing into said camera through said viewfinder by interposition of a totally reflecting portion of said mirror between said element and said rays passing through said viewfinder when said assembly is in said reflecting position, a retracted position of said assembly and said element against said base of said viewfinder when said film is being exposed, and said assembly including sealing surfaces for engaging each other and said base of said veiwfinder when said assembly and said element are moved toward each other and against said base of said viewfinder for preventing light from entering said camera through said viewfinder during an exposure.

2. An arrangement as set forth in claim 1 wherein a spring reacts between said assembly and said phototransducing element for urging it into said position into which it is disposed substantially perpendicularly to the rays of light passing through said semitransparent portion of said mirror from an object.

3. An arrangement as set forth in claim 1 wherein said pivot means rotatably connects said phototransducing element to said sealing plate.

4. An arrangement as set forth in claim 3 wherein the rear of said mirror at said spaced angle from said sealing plate in said reflecting position forms a stop for maintaining the end of said phototransducing element opposite from said pivot means in said position disposed substantially perpendicularly to said rays of light from said object.

5. An arrangement as set forth in claim 4 wherein a spring reacts between said phototransducing element and said sealing plate for maintaining said phototransducing element urged against said mirror in said substantially perpendicular position to said rays of light from said object.

6. An arrangement as set forth in claim 1 wherein a recess is formed in said sealing plate in line with the position of said phototransducing element, and said recess being large enough to completely receive said phototransducing element in said retracted position thereby minimizing the space required by assembly and said phototransducing element in said retracted position against the base of said viewfinder.

7. An arrangement as set forth in claim 1 wherein said semitransparent portion of said mirror is disposed directly in line with said phototransducing element in said position substantially perpendicularly disposed in the path of the rays of light from said object, and the remaining portion of said mirror being totally reflecting for directing rays of light from said object through said viewfinder in said reflecting position and for shielding said phototransducing element from rays of light passing through said viewfinder when said mirror is in said reflecting position.

8. An arrangement as set forth in claim 1 wherein said phototransducing element is a photoresistor.

9. An arrangement as set forth in claim 1 wherein said sealing surfaces are disposed upon mutually engaging peripheral portions of said sealing plate and said mirror, said sealing plate including a peripheral flange to permit said mirror to be nested within it in said retracted position, and said sealing plate also including a central recess for receiving said phototransducing element in said retracted positions.

10. A built-in exposure metering arrangement for a single lens reflex camera having an optical axis extending through its objective lens and film aperture comprising a viewfinder, a mirror having a semitransparent portion and being rotatable between an exposure position and an observation position, where said mirror reflects images through said viewfinder, a sealing plate being rotatable between an exposure position and an observation position, where said sealing plate covers said film aperture, said mirror being maintained in said observation position at a spaced angle from said sealing plate, a phototransducing element being mounted rotatably between said mirror and said sealing plate between an operative position, when said mirror and said sealing plate are in the observation position, and an inoperative position, when said mirror and said sealing plate are in exposure position, said phototransducing element being disposed in said operative position in line with said semitransparent portion and substantially perpendicularly to the rays of light passing through said semitransparent portion from an object.

11. A built-in exposure metering arrangement for a single lens reflex camera having an optical axis extending through its objective lens and film aperture and a viewfinder with its optical axis intersecting said optical axis of said camera at the deflecting mirror which moves clear of the exposure area of the camera during an exposure, said arrangement comprising at least a portion of said mirror being semitransparent, a sealing plate movably mounted in said camera between said deflecting mirror and said film aperture, a phototransducing element, rotatable means mounting said sealing plate and said deflecting mirror together at one end thereof to form an angularly associated assembly, stop means which form a limit of travel for said assembly when it is moved clear of said exposure area, a mirror stop in said camera maintaining said deflecting mirror in a position for reflecting images through said viewfinder, a sealing stop disposed in front of said film aperture for maintaining said sealing plate in its sealing position at a spaced angle from said mirror in said reflecting position, pivot means mounting said phototransducing element upon said assembly between said mirror and said sealing plate and disposed in line with said semitransparent portion of said deflecting mirror, mutually engaging means upon said phototransducing element and said mirror and sealing plate assembly for maintaining said phototransducing element disposed substantially perpendicularly to the rays of light passing through said semitransparent portion from an object.

References Cited in the file of this patent
UNITED STATES PATENTS

| | | |
|---|---|---|
| 1,993,084 | Brewer | Mar. 5, 1935 |
| 2,297,428 | Nuchterlein | Sept. 29, 1942 |
| 2,887,019 | Dodin | May 19, 1959 |